Figure 1:
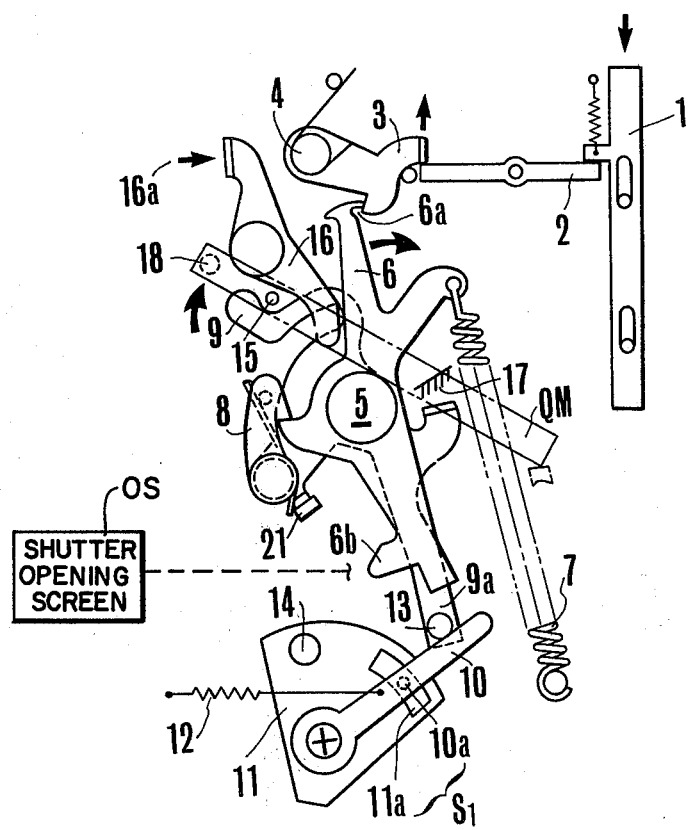

United States Patent [19]

Isobe et al.

[11] 3,971,047
[45] July 20, 1976

[54] SINGLE LENS REFLEX CAMERA HAVING AN ELECTRIC SHUTTER

[75] Inventors: Yasuo Isobe, Kawasaki; Tadashi Ito; Fumio Ito, both of Yokohama, all of Japan

[73] Assignee: Canon Kabushiki Kaisha, Tokyo, Japan

[22] Filed: May 6, 1974

[21] Appl. No.: 467,473

[30] Foreign Application Priority Data

May 9, 1973 Japan................................ 48-51376

[52] U.S. Cl. ................................ 354/50; 354/51; 354/238
[51] Int. Cl.² ...................... G03B 7/08; G03B 9/62
[58] Field of Search ................. 354/48, 50, 51, 238

[56] References Cited
UNITED STATES PATENTS

| | | | |
|---|---|---|---|
| 3,641,902 | 2/1972 | Kikuchi et al. | 354/238 X |
| 3,678,826 | 7/1972 | Mori et al. | 354/51 |
| 3,683,767 | 8/1972 | Sahara | 354/51 |
| 3,721,166 | 3/1973 | Yanagi et al. | 354/60 X |
| 3,820,131 | 6/1974 | Tanaka | 354/38 |

*Primary Examiner*—L. T. Hix
*Assistant Examiner*—James LaBarre
*Attorney, Agent, or Firm*—Toren, McGeady and Stanger

[57] ABSTRACT

In a single lens reflex camera, a lever responsive to operation of a shutter button initiates timing of an electronic shutter control a predetermined time interval before the shutter is actually opened. The predetermined time interval corresponds to the time elapse between the moment the shutter control changes the current which operates the magnet that holds the shutter open and the moment the magnet actually causes the shutter to close. After this predetermined time interval the shutter is opened, such as by running of the opening screen. After the measured shutter interval has ended, a current in the shutter control changes and operates on a magnet which has been holding the shutter open and causes the magnet to close the shutter, such as by releasing a closing screen.

10 Claims, 3 Drawing Figures

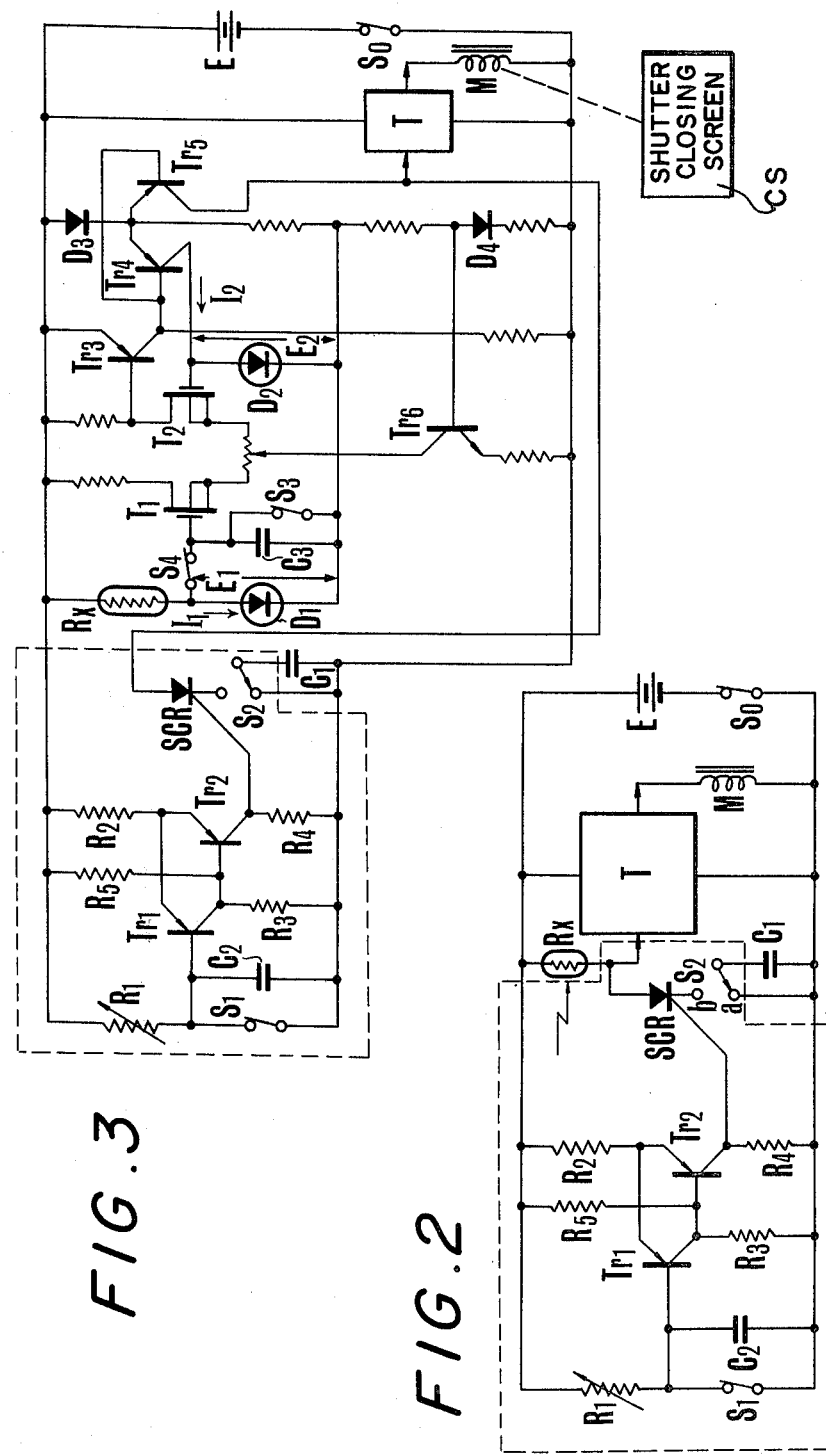

SINGLE LENS REFLEX CAMERA HAVING AN ELECTRIC SHUTTER

The present invention relates to a single lens reflex camera having an electric shutter, especially to a correction device for correcting the exposure in an electric shutter. Because the front screen and the rear screen of a focal plane shutter overlap before the shutter screen starts running there is difference between the time interval from the moment the front screen starts running till exposure is actually started and the time interval from the moment the rear screen starts running till the shutter starts closing.

In some focal plane shutters, the exposure time is controlled by a time constant circuit, structured so that the time constant circuit is triggered at the same time the front screen is started and a magnet is demagnetized after an elapse of time determined according to the brightness of an object so as to release the rear screen. In such shutters a proper exposure time can not be obtained because of the time differential caused by the above mentioned overlapping of the front screen and the rear screen.

A time differential may also be generated between the shutting off of the exciting current to an electro-magnet which holds the rear screen checking member and the start of the running of the rear screen. This may also cause an error in exposure time.

Although mechanical correction of such error in exposure time caused by such reasons has been done conventionally, accurate adjustment has been very difficult.

An object of the present invention is to provide a switching circuit to trigger a time control circuit for making the switching time of said switching circuit adjustable so that the above mentioned error in exposure time can be corrected.

Now, the present invention will be explained in detail referring to the drawings of examples.

FIG. 1 is a structural sketch to show a driving mechanism for a shutter release mirror of a single lens reflex camera having an exposure correction device according to the present invention. FIG. 2 is a circuit connection diagram to show an example of an electric shutter control having an exposure correction device according to the present invention. FIG. 3 is a circuit connection diagram to show another example of the present invention.

In FIG. 1, a release lever 1 is linked with a release button not shown in the drawing. Member 2 is a linking lever. Member 3 is a checking lever for a movable reflective mirror QM. Member 4 is an axially supporting axle for the lever 3. Element 6 is a first reflective mirror driving lever axially supported on the axle 5 in a freely swingable manner. When an end 6b of the element 6 reaches a predetermined point in clockwise travel of lever 6 it release a shutter opening screen or shutter front screen OS. Member 7 is a driving spring attached to the lever 6. Element 8 is a checking member engaged with the lever 6. Element 9 is a second reflective mirror driving lever axially supported on the axle 5 of the lever 6. Because of the relationship between the checking member 8 and the first reflective mirror lever 6, the second reflective mirror lever 9 is that which is used in a conventionally known driving mechanism for a single lens reflex reflective mirror, detailed explanations thereof will be omitted. Next, member 10 is a movable contacting piece having a contact 10a. A fixed contacting plane 11 has an electrically conductive contacting plane 11a provided on a camera main body. A spring 12 serves to bias the movable contacting piece 10 in a counter-clockwise direction. A pin 14 is mounted on the fixed contacting plane 11. A pin 13 is mounted on one end 9a of the lever 9 and serves to restrict the movable contacting piece 10.

FIG. 2 is a circuit connection diagram to show an example of electric shutter control having an exposure correction device according to the present invention, wherein the portion enclosed by a broken line is a correction circuit. In the drawing, $R_1$ represents a variable resistance. A capacitor $C_2$ determines the time constant factor of the correction circuit together with the resistor $R_1$. A switch $S_1$ and its contact corresponds to that shown as 10a and 11a in FIG. 1.

Transistor $Tr_1$, $Tr_2$ form a Schmidt trigger circuit. Resistors $R_2$ to $R_5$ represent resistances in each part of the Schmidt circuit. Element SCR is a thyrister. Element $S_2$ is a transfer or selector switch. A capacitor $C_1$ forms a time constant circuit for time control of an electric shutter circuit. Member Rx is a light receiving element consisting of a photo-conductive element. Element T is an electric shutter circuit, and commonly known various switching circuits, etc. may be used therefor. Element M is an electro-magnet to hold a shutter rear screen or shutter closing screen CS. Element E is a power source battery. Element $S_o$ is a power source switch.

FIG. 1 shows the shutter just about to be released. In operation when the release lever 1 descends in response to pressing of a release button which is not shown in the drawing, the engagement between the checking lever 3 and the engaging part 6a of the first reflective mirror driving lever 6 is released by the linking lever 2. In response the lever 6 is rotated clockwise around the axle 5 by the spring 7. Therefore the second reflective mirror driving lever 9 with its pin 13 is rotated in a clockwise direction by the checking member 8. The spring 12 rotates the movable member or 10 in a counter-clockwise direction. At the initial stage of this rotation the contact 10a and the conductive part 11a contact each other and this turns on the switch $S_1$ of FIG. 2. When the movable contacting piece 10 is further rotated in a counter-clockwise direction and is located at a position between a point where the contact 10a and the conductive part 11a will not touch and a point where the contacting piece 10 is stopped by the pin 14, the switch $S_1$ of FIG. 2 will be off. As the switch $S_1$ is turned off, the capacitor $C_2$ starts charging through the variable resistor $R_1$. Although not shown in the drawing, the rotation of the second reflective mirror driving lever 9 in a clockwise direction transfers the selector switch $S_2$ from the contact a to b before the switch $S_1$ is switched off. The second reflective mirror driving lever 9 is driven integrally with the first reflective mirror driving lever 6. As the reflective mirror QM is rotated upward in a counter-clockwise direction around the axle 18 by the pin 15 on the reflective mirror engaged with the lever 9, one end 6b of the first reflective mirror driving lever 6 releases a shutter front screen or opening screen OS which is shown schematically.

In this example, the charging of the capacitor $C_1$ is already started before the shutter release. Therefore the time interval from the moment the front screen OS starts running till the moment the rear screen starts running is made shorter than the shutter time determined of the time constant factor by the light receiving element Rx and the capacitor $C_1$. One end 16a of the lever 16 is pressed in the direction of the arrow by the signal closing the rear screen after exposure is completed and the engagement of the checking member 8 and the first reflective mirror driving lever 6 is released. Therefore, only the second reflective mirror driving lever 9 is rotated in a counter-clockwise direction by the force of a spring not shown in the drawing, and the pin 13 rotates the movable contacting piece 10 in a clockwise direction to turn the switch $S_1$ on. Also the selector switch $S_2$ is transferred from contact b to a by the movement of the second reflective mirror driving lever 9 in a counterclockwise direction.

Next, the reflective mirror QM resumes its original position and the second reflective mirror driving lever 9 is stopped by a stopper 21 and is held in place. On the other hand the first reflective mirror driving lever 6 is further rotated in a clockwise direction by the force of the spring 7 and is stopped by the stopper 17. The first reflective mirror driving lever 6 is rotated in a counter-clockwise direction against the spring 7 in association with next shutter wind-up action, and the lever 6 is checked to the checking member 8 and the checking lever 3. Thus wind up is completed and the state shown in FIG. 1 is resumed.

FIG. 2 shows each switch position in a state wherein shutter is about to be released. In operation, an exciting current flows to the electro-magnet M as the power source switch is turned on to hold the rear screen, and the selector switch $S_2$ is transferred from the contact a to b in association with upward pivot of the reflective mirror after pressing of a shutter button, and the switch $S_1$ is turned off. This starts charging of the capacitor $C_2$ through the variable resistor $R_1$. When the electric potential of the $C_2$ reaches to a predetermined level, the transistor $Tr_1$ of the Schmidt circuit turns off while $Tr_2$ turned on, and the thyrister SCR is turned on by the voltage of the resistor $R_4$. Since the switch $S_2$ has already been transferred to b, this starts charging of $C_1$. Next, as shown by the explanation of FIG. 1 the shutter front or opening screen OS runs and as a predetermined amount of electric potential is accumulated at the capacitor $C_1$, the electric shutter circuit T is inverted and current to the electro-magnet M is cut off. Now as is well known, there is certain time delay from the time the current to the electro-magnet M is shut off till the rear screen or shutter closing screen CS runs. The error in exposure caused by this delay is corrected in the present invention by starting the charging of the capacitor $C_1$ of the shutter time control time constant circuit before the shutter front screen runs. After completion of the running of the rear screen CS the reflective mirror QM descends and the switch $S_1$ turns on, while $S_2$ is transferred from b to a, thereby discharging the electric potential of $C_2$. The SCR is reset and turns off, thereby discharging the electric potential of $C_1$. Thus by wind up of the shutter, the state of FIG. 2 is resumed. While in the device shown in the drawing the interval from the time switch $S_1$ becomes off till the SCR becomes on, that is time interval since the $S_1$ becomes off till charging of $C_1$ is started is varied by the variable resistor $R_1$, the capacity of the capacitor $C_2$ may be changed. Also it is possible to have the switch $S_1$ actuated at a desired position of the reflective mirror QM by rotating the position of the fixed contacting plane 11 in FIG. 1 and fixing the same at a suitable position. Although the example in FIG. 2 indicates that the charging time constant factor of the capacitor $C_1$ is used as a shutter time determining means, it is also possible to employ other means, for example a digital time control system.

FIG. 3 is a circuit connection diagram showing one example of an electric shutter using the exposure correction device according to the present invention, wherein a memory type electric shutter is used as the electric shutter circuit. The circuit arrangement and function of this example are very similar to those explained for FIG. 1 and FIG. 2.

The portion enclosed by the broken line in the drawing shows the exposure correction device according to the present invention.

In this drawing, the parts having same identification marks with those in FIG. 2 have same function as those shown in FIG. 2, and Rx is a light receiving element to receive the light from an object through a photographing lens and a reflective mirror to vary its resistance value.

$D_1$ is a diode (log diode) of logarithmic characteristics, $C_3$ is a memory capacitor, and $T_1$, $T_2$ are field effective type transistors (for example MOS-FET), wherein a differential type amplifier is composed by these parts.

$D_2$ is a log diode of a regeneration circuit having same characteristics with that of the diode $D_1$. $Tr_3$ and $Tr_4$ are transistors composing a feed back path of the regeneration circuit. $Tr_5$ is a transistor which functions as a resistance element of a shutter time control circuit. $C_1$ is a capacitor of the time control circuit. $Tr_6$ is a transistor for stabilizing constant current of the differential amplifier. $D_3$ and $D_4$ are diodes for stabilizing the circuits. T is a trigger amplifier for example like a Schmidt trigger circuit. M is an electro-magnet which is actuated by the output of the trigger circuit. $S_3$ is a trigger switch of the memory circuit. $S_4$ is a switch for retaining memory.

As the switch $S_3$ is opened by pressing of the shutter button, a voltage corresponding to the resistance value of the light receiving element Rx is generated between the terminals of the log diode $D_1$ by the current $I_1$. The latter flows from the battery E to the light receiving element Rx, the log diode $D_1$ and the diode $D_4$. The memory capacitor $C_3$ is charged by the voltage $E_1$ which is generated between said terminals. This voltage is in proportion to the amount of light received. Next as the switch $S_4$ is opened in association with the pressing of the shutter button, the terminal voltage of the capacitor $C_3$ retains the memorized value just before the actuation of the shutter. Since a log diode having a logarithmic compression characteristics is used in this photo-sensing circuit, a wide range of incident light can be effectively memorized. Next, MOS-FET $T_1$, $T_2$ composed of a differential amplification circuit and the log diode $D_2$ having same characteristics as that of the log diode in the photo-sensing circuit is connected to the gate circuit of the FET $T_2$. The current $I_2$ flowing thereto will set $I_1 = I_2$ by the action of the transistor circuits $Tr_3$, $Tr_4$. Therefore, the terminal voltage $E_2$ of the log diode $D_2$ becomes equal to the voltage $E_1$ of the log diode of the photo-sensing circuit and becomes equal to the voltage memorized by the memory capacitor $C_3$. When this state is obtained, the circuits are balanced and the resistance value between the emitter and the collector of the transistor $Tr_4$ becomes equal to the resistance of Rx. In this example, another transistor $Tr_5$ which performs same function as that of said transistor $Tr_4$ is provided and the resistance between the emitter and the collector of the $Tr_5$ is used for controlling the shutter time, and the capacitor $C_1$ of the CR time constant circuit is charged by the resistance between the emitter and collector of said $Tr_5$ so that the shutter time is determined using the delay time of the same.

As in the previous example when the switch $S_1$ is opened in association with the jump up of the mirror and at the same time the change over switch $S_2$ is changed over from $a$ to $b$, the time constant circuit consisting of the resistor $R_1$ and the capacitor $C_2$ is actuated and the electric potential of $C_2$ reaches to a predetermined value, the transistor $Tr_1$ of the Schmidt circuit becomes off while the transistor $Tr_2$ becomes on so that the thyrister SCR becomes on by the voltage of the resistance $R_4$. And when the time constant circuit consisting of the transistor $Tr_5$ and the capacitor $C_1$ is actuated by this and the electric potential of the capacitor $C_1$ reaches to a predetermined value the electric shutter circuit T is inversed and current to the electromagnet M is cut off.

While an electro-magnet is used in both of the above examples to retain the rear screen checking member, a permanent magnet may be used in place of the electromagnet. In this case coil is wound around the permanent magnet so that when the checking of the shutter rear screen is released current of such direction as nullifying the magnetic power of the permanent magnet is flown thereto.

The present invention has, as has been explained above, such set-up that a switching circuit which is triggered by a switching means linked with the jump up of the reflective mirror and such semi-conductor switching element as being controlled by the output of said switching circuit are provided, wherein the shutter time counting of the shutter exposure time control circuit is started by said switching element and the time constant factor of the above mentioned switching circuit is adjusted as desired, thereby the starting time of shutter time counting can be controlled. Therefore the error in exposure caused by the previously mentioned reasons can be corrected thus correct exposure time can be obtained.

What is claimed is:

1. For a single lens reflex camera having a focal plane shutter with a shutter opening screen and a shutter closing screen as well as a shutter release coupled to the shutter opening screen for initiating operation of the shutter opening screen: a shutter control comprising, magnet means adapted to be coupled to the closing screen for retaining and then releasing the closing screen, first timing means responsive to ambient light and coupled to said magnet means for establishing a first timing interval corresponding to the ambient light and constraining said magnet means to release the closing screen after actuation of the first timing means and the elapse of the first timing interval; and second timing means, coupled to said first timing means, and actuable by said shutter release prior to initiation of operation of said opening screen, for actuating said first timing means after a second time interval from actuation of said second timing means.

2. An apparatus as in claim 1, wherein said second timing means is adjustable.

3. An apparatus as in claim 1, wherein said magnet introduces a delay between actuation thereof and release of said closing shutter, and wherein said second timing means is adjustable for establishing a time interval equal to the delay.

4. An apparatus as in claim 3, wherein the shutter release includes a swingable mirror and second timing means adapted to respond to operation of said swingable mirror.

5. An apparatus as in claim 3, wherein said first timing means includes a memory element responsive to ambient light for memorizing a value corresponding to the ambient light and establishing an interval corresponding to the memorized value.

6. A single lens reflex camera, comprising shutter means having a focal plane opening screen and a focal plane closing screen, retaining means for retaining said opening screen and then releasing it, magnet means for retaining said closing screen and then releasing it, shutter release means coupled to said retaining means for actuating said retaining means so as to release said opening shutter, first timing means responsive to ambient light and coupled to said magnet means for establishing a time interval on the basis of the ambient light and for causing said magnet to release said shutter closing screen subsequent to actuation of said first timing means and the elapse of the interval, second timing means actuated by said release means prior to actuation of said retaining means for establishing a second interval and actuating said first timing means after the actuation of said second timing means and elapse of the second interval.

7. An apparatus as in claim 6, wherein said release means includes a swingable reflex mirror and said second timing means and said retaining means respond to movement of said swingable mirror, said first timing means being actuated by said swingable mirror before said retaining means upon actuation of said release means.

8. A single lens reflex camera, comprising:
a movable reflex mirror arrangement and a focal plane shutter with a front screen and a rear screen,
an exposure time control circuit,
a magnet for retaining the rear screen, said magnet being coupled to and actuable by the exposure time control circuit for releasing the rear screen, said front screen being coupled to the reflex mirror arrangement and actuable in response to motion of the reflex mirror arrangement,
switching means responsive to motion of the reflex mirror,
a switching circuit triggered by said switching means and
a semiconductor switching element controlled by the output of said switching circuit for starting the action of the exposure time control circuit, said switching circuit having an adjusting member for adjusting starting of the exposure control circuit.

9. A single lens reflex camera as in claim 8, further comprising switching means for a memory circuit, said switching means opening in response to shutter release and having memory means for responding to ambient light and memorizing the amount of ambient light.

10. A single lens reflex camera comprising:
a lens
a rear shutter screen
an exposure time control circuit,
a magnet for retaining said rear shutter screen, said magnet being actuated by the output of said exposure time control circuit for releasing the rear screen, a reflective mirror, a driving member for driving the reflective mirror, a shutter front screen, said front screen being actuated by the reflective mirror driving member, switching means coupled to the driving member and switched by motion of the driving member, a switching circuit responsive to said switching means, and a semiconductor switching element controlled by the output of said switching circuit for initiating operation of said exposure time control circuit, said switching circuit having an adjusting member for controlling the actuation of said exposure control circuit, said reflective mirror driving member having a member for actuating the switching means of said switching circuit.

* * * * *